(12) United States Patent
Okubo

(10) Patent No.: US 11,283,992 B2
(45) Date of Patent: Mar. 22, 2022

(54) IMAGE CAPTURING APPARATUS THAT CAPTURES IMAGE FOR DISPLAY AND METHOD OF CONTROLLING IMAGE CAPTURING APPARATUS

(71) Applicant: CANON KABUSHIKI KAISHA, Tokyo (JP)

(72) Inventor: Toshiyuki Okubo, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/150,122

(22) Filed: Jan. 15, 2021

(65) Prior Publication Data

US 2021/0227130 A1 Jul. 22, 2021

(30) Foreign Application Priority Data

Jan. 21, 2020 (JP) .............................. JP2020-007679

(51) Int. Cl.
*H04N 5/232* (2006.01)

(52) U.S. Cl.
CPC ..... *H04N 5/23227* (2018.08); *H04N 5/23293* (2013.01)

(58) Field of Classification Search
CPC ............. H04N 5/23293; H04N 5/2353; H04N 5/23227; H04N 5/232
USPC .... 348/222.1, 322, 333.01, 229.1, 362, 296, 348/297; 345/173–178
See application file for complete search history.

(56) References Cited

U.S. PATENT DOCUMENTS

| | | | |
|---|---|---|---|
| 8,934,041 B2 | 1/2015 | Hirai | |
| 9,615,018 B2* | 4/2017 | Hamada | .............. H04N 9/04557 |
| 2015/0022688 A1* | 1/2015 | Shiohara | ................ H04N 5/243 |
| | | | 348/229.1 |
| 2017/0054894 A1* | 2/2017 | Takanashi | .............. G03B 13/36 |

FOREIGN PATENT DOCUMENTS

JP 2012044566 A 3/2012

\* cited by examiner

*Primary Examiner* — Xi Wang
(74) *Attorney, Agent, or Firm* — Rossi, Kimms & McDowell LLP

(57) ABSTRACT

An image capturing apparatus that makes it possible to display a live view video in which motion of an object is naturally expressed during continuous shooting. An image capturing apparatus includes an image capturing unit including an image sensor, and a control circuit configured to capture a still image for storage and a display image for display on a display device, using the image capturing unit. In still image continuous shooting by the image capturing unit, the control circuit sets a capturing timing of the still image and then sets a capturing timing of the display image in a remaining time obtained by subtracting a time required to capture the still image from a period at which the still image is captured such that at least one frame of the display image can be displayed on the display device with a predetermined delay time.

7 Claims, 7 Drawing Sheets

IMAGE CAPTURING APPARATUS THAT CAPTURES IMAGE FOR DISPLAY AND METHOD OF CONTROLLING IMAGE CAPTURING APPARATUS

BACKGROUND OF THE INVENTION

Field of the Invention

The present invention relates to an image capturing apparatus that captures an image for display, and a method of controlling the image capturing apparatus.

Description of the Related Art

As a method used when performing image capturing using an image capturing apparatus, such as a digital still camera, there is a method in which a photographer performs a release operation at a desired timing in a state in which an object image is being displayed as a live view video on a display device provided on the image capturing apparatus. Japanese Laid-Open Patent Publication (Kokai) No. 2012-44566 discloses a technique for properly providing a display image for checking an object to a photographer, in a case where continuous shooting is performed using this method. In an image capturing apparatus described in Japanese Laid-Open Patent Publication (Kokai) No. 2012-44566, when an image capturing device generates image data, based on the generated image data, in a first mode, an after-view image for display is generated from image data for generating an image for storage, and in a second mode, a live view image for display (hereafter referred to as the "LV image") is generated from other image data different from the image data for generating the image for storage. Then, the first mode and the second mode (whether to display the after-view image or the LV image) are switched according to the state of the image capturing apparatus.

However, in the method described in Japanese Laid-Open Patent Publication (Kokai) No. 2012-44566, in a case where the speed of continuous shooting is increased, smoothness of the live view display is sometimes lost due to variation in display delay time. This phenomenon will be described with reference to FIG. 7.

FIG. 7 is an example of a conventional timing diagram for capturing and displaying LV images each during an interval between respective operations for capturing still images. Readout of signals from the first line is started in synchronism with an image capturing synchronization signal. Reset is performed at a timing preceding the readout timing by a charging time set in advance. Signals of all lines are read out for a still image for storage (hereinafter simply referred to as the "still image"), whereas addition readout or thinning readout is performed for each LV image. For this reason, a time required to read out a LV image is shorter than a time required to read out a still image.

In the example shown in FIG. 7, still images are not displayed but only LV images are displayed during continuous shooting. At this time, each LV image is displayed in synchronism with a display synchronization signal. Note that the shortest period of the display device can be used as the period of the display synchronization signal. Further, a period at which a still image is captured (still image-capturing period) corresponds to a so-called shooting frame speed and is set independently of the display period of the display device.

Charge accumulation for capturing a LV image is performed immediately after completion of readout of a still image. Therefore, the capturing timing of a LV image is set with reference to the capturing timing of a still image. The image signals of a LV image read out from the image capturing device are sent to a storage device (e.g. a DRAM) included in the image capturing apparatus and are displayed thereafter in synchronism with a display synchronization signal which appears first. This makes it possible to display the LV image immediately after shooting a still image.

Here, the image capturing interval of LV images and the display interval of LV images are set independently of each other, and hence variation is generated in time lag (display delay time) from completion of readout of each LV image until display of the LV image on the display device. For example, in FIG. 7, a time $t_L1$ from completion of readout of a LV image 1 to completion of readout of a LV image 2 is equal to a time $t_L2$ from completion of readout of the LV image 2 to completion of readout of a LV image 3. However, a time $t_S1$ from the start of display of the LV image 1 to the start of display of the LV image 2 is different in length from a time $t_S2$ from the start of display of the LV image 2 to the start of display of the LV image 3. That is, between the frames of the LV image, discrepancy occurs between the image capturing interval and the display interval, which causes the object to appear to perform unnatural motion.

SUMMARY OF THE INVENTION

The present invention provides an image capturing apparatus that captures images for display such that a live view video in which motion of an object is naturally expressed can be displayed during continuous shooting, and a method of controlling the image capturing apparatus.

In a first aspect of the present invention, there is provided an image capturing apparatus comprising an image capturing unit including an image sensor, and a control circuit configured to capture a still image for storage and a display image for display on a display device, using the image capturing unit, wherein for still image continuous shooting by the image capturing unit, the control circuit sets a capturing timing of the still image and thereafter sets a capturing timing of the display image such that at least one frame of the display image can be displayed on the display device with a predetermined delay time within a remaining time obtained by subtracting a time required to capture the still image from a period at which the still image is captured.

In a second aspect of the present invention, there is provided a method of controlling an image capturing apparatus, comprising calculating a time per shot still image for continuously shooting still images for storage based on a designated continuous shooting speed, setting a capturing timing of the still image first in the time per shot still image, calculating a remaining time by subtracting a time required to capture the still image from the time per shot still image, and setting a capturing timing of a display image for display on a display device such that at least one frame of the display image can be displayed on the display device with a predetermined delay time within the remaining time.

According to the present invention, it is possible to display a live view video in which motion of an object is naturally expressed during continuous shooting.

Further features of the present invention will become apparent from the following description of exemplary embodiments (with reference to the attached drawings).

DESCRIPTION OF THE EMBODIMENTS

Figure 1:
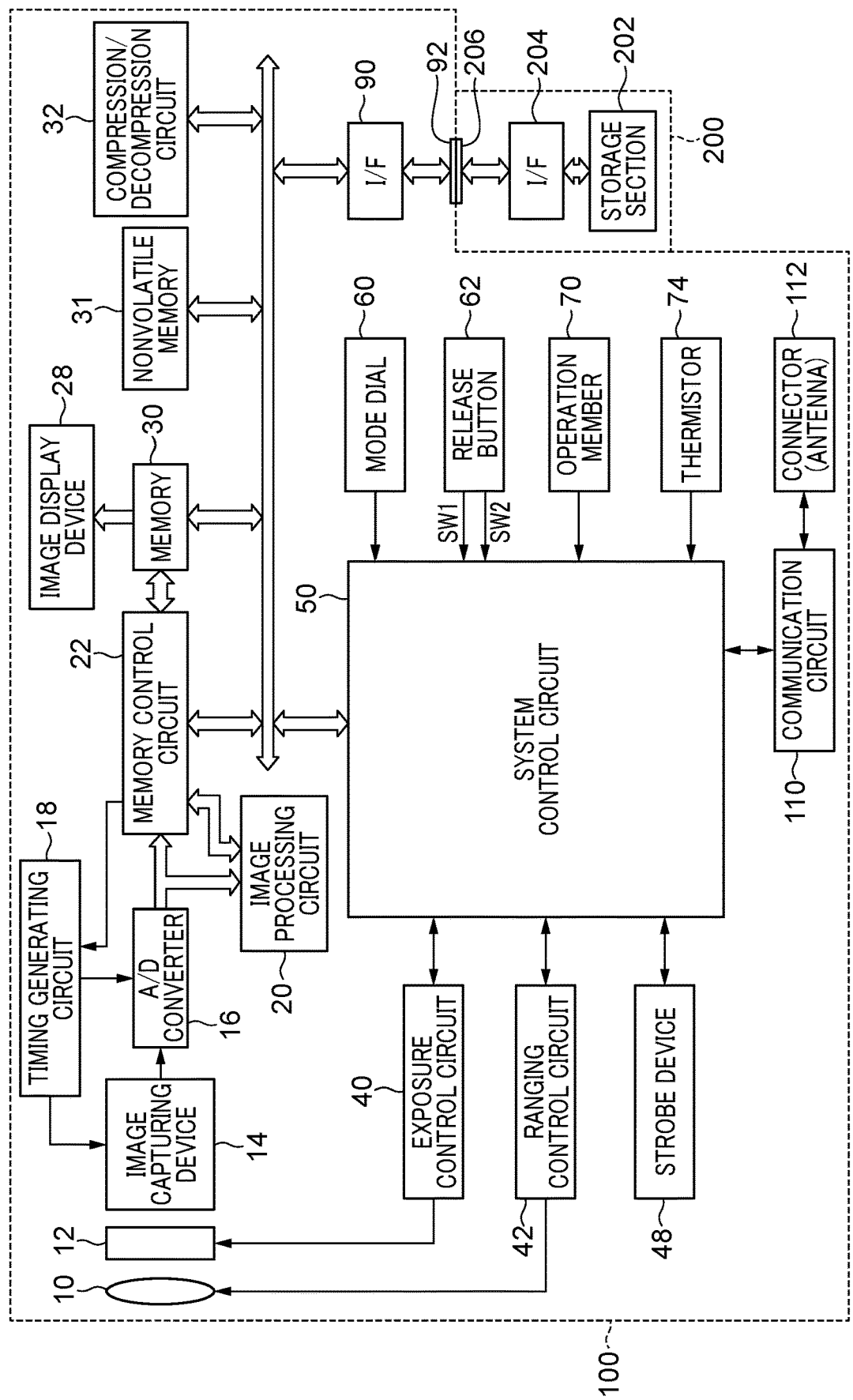
FIG. 1 is a block diagram showing a schematic configuration of an image capturing apparatus according to an embodiment of the present invention.

The present invention will now be described in detail below with reference to the accompanying drawings showing embodiments thereof. FIG. 1 is a block diagram showing a schematic configuration of an image capturing apparatus 100 according to an embodiment of the present invention.

The image capturing apparatus 100 includes a shooting lens 10, a diaphragm 12, an image capturing device 14 including an image sensor, an analog-to-digital converter 16, a timing generating circuit 18, an image processing circuit 20, a memory control circuit 22, an image display device 28, a memory 30, a nonvolatile memory 31, a compression/decompression circuit 32, and a system control circuit 50. Further, the image capturing apparatus 100 includes an exposure control circuit 40, a ranging control circuit 42, a strobe device 48, a mode dial 60, a release button 62, an operation member 70, and a thermistor 74. Furthermore, the image capturing apparatus 100 includes an interface 90, a connector 92, a communication circuit 110, and a connector (antenna) 112.

The shooting lens 10 takes in light reflected from an object and causes the incident light to form an image on the image capturing device 14. The diaphragm 12 adjusts the amount of light entering the image capturing device 14. The image capturing apparatus 100 may be configured as an image capturing system that is comprised of a body and an interchangeable lens which can be removably attached to the body, with the shooting lens 10 and the diaphragm 12 being arranged within the interchangeable lens.

The image capturing device 14 converts an optical image formed on an imaging surface thereof to electrical signals. The image capturing apparatus 100 has an electronic shutter function of controlling the charging time by controlling reset timing of the image capturing device 14. The analog-to-digital converter 16 converts signals (analog electrical signals) output from the image capturing device 14 to digital signals (image data). The timing generating circuit 18 supplies a clock signal and a control signal to the image capturing device 14 and the analog-to-digital converter 16. The timing generating circuit 18 is controlled by the memory control circuit 22 and the system control circuit 50.

The image processing circuit 20 performs various image processing, such as pixel interpolation and color conversion, on image data acquired from the analog-to-digital converter 16 or image data acquired from the memory control circuit 22. Further, the image processing circuit 20 performs predetermined calculation processing using captured image data and performs AWB (Auto White Balance) processing based on the obtained calculation result. Further, the image processing circuit 20 enables an electronic zoom function by cutting out an image and scaling thereof. The image processing circuit 20 performs calculation processing using captured image data, for generating data required by the system control circuit 50 to control the exposure control circuit 40 and the ranging control circuit 42, and sends the calculation result to the system control circuit 50.

The memory control circuit 22 controls the analog-to-digital converter 16, the timing generating circuit 18, the image processing circuit 20, the memory 30, and the compression/decompression circuit 32. Captured image data is written into the memory 30 via the image processing circuit 20 and the memory control circuit 22, or directly via the memory control circuit 22.

In the present embodiment, the image display device 28 is a liquid crystal display device or an organic EL display device provided on a rear surface of a casing of the image capturing apparatus 100 but is not limited to this. Image data for display, written into the memory 30, is displayed on the image display device 28 via the memory control circuit 22. By sequentially displaying captured image data on the image display device 28, a photographer can perform shooting while checking the live view video displayed on the image display device 28.

The memory 30 is e.g. a semiconductor storage device, such as a memory card and a hard disk, for storing captured still images and moving images, and has a sufficient storage capacity capable of storing a predetermined number of still images and a predetermined duration of moving images. Further, when continuous shooting of a plurality of still images or panorama shooting is performed, it is also possible to write a large amount of image data into the memory 30 at high speed. Note that the memory 30 can also be used as a work area for the system control circuit 50.

The nonvolatile memory 31 is implemented e.g. by a flash ROM and stores program codes, etc., which are executed by the system control circuit 50. Further, the nonvolatile memory 31 is provided with an area for storing system information and an area for storing user setting information, which enables various information and settings to be read out therefrom and restored at the next start of the image capturing apparatus 100. The system control circuit 50 is an image capturing controller that controls the overall operation of the image capturing apparatus 100 by sequentially reading out and executing the program codes written in the nonvolatile memory 31.

The compression/decompression circuit 32 reads image data stored in the memory 30, compresses/decompresses the image data using adaptive discrete cosine transform (ADCT) and the like, and writes the processed image data into the memory 30.

The exposure control circuit 40 controls a shutter speed (exposure time), an aperture value, and a sensitivity, and further performs strobe light control (light control in flash light shooting) in conjunction with the strobe device 48. The ranging control circuit 42 controls focusing of the shooting lens 10. The strobe device 48 emits AF auxiliary light and irradiates an object with flash light when flash light shooting is performed. The exposure control circuit 40 and the ranging control circuit 42 are controlled by the system control circuit 50. The system control circuit 50 controls the exposure control circuit 40 and the ranging control circuit 42 based on a result of calculation performed on the captured image data by the image processing circuit 20, whereby AF processing and AE processing are performed.

The mode dial 60, the release button 62, and the operation member 70 are examples of operation means for inputting a user's instruction to the image capturing apparatus 100. The operation means is not limited to these, but also includes switches and buttons, a touch panel in an overlaid state on the image displaying section 28, a pointing device based on line-of-sight detection, a voice recognition device, and so forth, provided singly or in combination.

The mode dial 60 is an operating device for switchingly setting various function modes, such as an automatic shooting mode, a manual shooting mode, a panorama shooting mode, a moving image shooting mode, a reproduction mode, and a PC connection mode. When the release button 62 is half-pressed, a first switch SW1 is turned on, and when the first switch SW1 is turned on, the system control circuit 50 starts shooting preparation operations, such as operations of the AF processing, the AE processing, and the AWB processing. When the release button 62 is fully pressed, a second switch SW2 is turned on, and a series of shooting operations are performed.

The operation member 70 is operation means other than the aforementioned operation means explicitly depicted in FIG. 1, such as the mode dial 60, and includes a menu button, a set button, a macro button, a multi-screen reproduction page-break button, a flash setting button, and single shooting/continuous shooting/self-timer shooting-switching button.

The thermistor 74 measures the internal temperature of the image capturing apparatus 100. Defective pixels of the image capturing device 14 are affected by the temperature, and hence it is necessary to change defective pixel correction processing according to a temperature detected at the time of image capturing. For this reason, the thermistor 74 is disposed in the vicinity of the image capturing device 14 within the image capturing apparatus 100 to measure the temperature of the image capturing device 14.

The interface 90 is for enabling communication between a storage medium 200, such as a memory card (semiconductor storage device) or a hard disk, and the system control circuit 50. The connector 92 is for mechanically and electrically connecting between the image capturing apparatus 100 and the storage medium 200.

The communication circuit 110 is an interface that enables communication with an external device e.g. via a USB cable, an IEEE1394 cable, a LAN, or a wireless communication link. The connector (antenna) 112 is a connector (for wired communication) or an antenna (for wireless communication) for communicably connecting between the image capturing apparatus 100 and an external device via the communication circuit 110.

The storage medium 200 can be attached and removed to and from the connector 92. The storage medium 200 includes a storage section 202 implemented by a semiconductor memory, a magnetic disk, or the like, an interface 204 which enables communication with the image capturing apparatus 100, and a connector 206 for mechanically and electrically connecting between the image capturing apparatus 100 and the storage medium 200.

Figure 2:
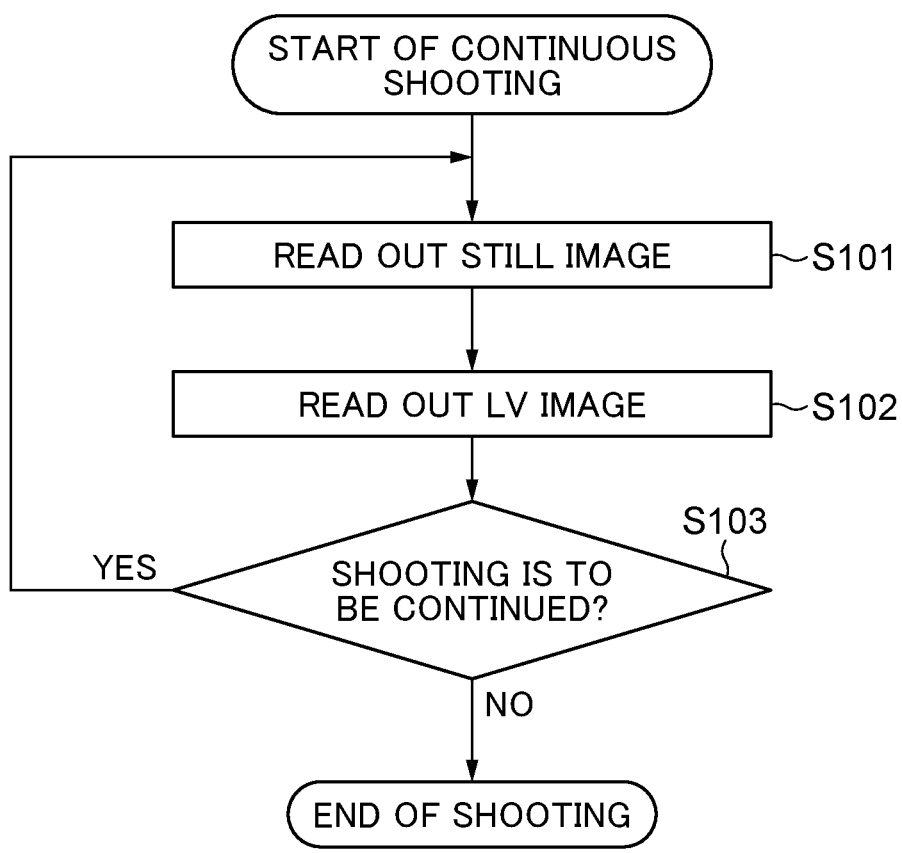
FIG. 2 is a flowchart of a continuous shooting process performed by the image capturing apparatus.

FIG. 2 is a flowchart of a continuous shooting process performed by the image capturing apparatus 100. Processing operations (steps) each indicated by a step number S in the flowchart in FIG. 2 are realized by the system control circuit 50 that executes a predetermined program stored in the nonvolatile memory 31 and comprehensively controls the operations of the components of the image capturing apparatus 100. Note that continuous shooting is assumed to have been set before starting the continuous shooting process in FIG. 2. Further, continuous shooting is started in a state in which the live view video is being displayed on the image display device 28. The system control circuit 50 starts continuous shooting when it is detected that the second switch SW2 has been turned on.

In a step S101, the system control circuit 50 performs exposure processing (first image capturing) for capturing a still image for storage using the settings of the shutter speed, the aperture value, and the sensitivity, determined by the automatic exposure control in advance, or settings designated by a user as desired. More specifically, shot image data is generated by exposure of the image capturing device 14 with a predetermined amount of light, photoelectric conversion by the image capturing device 14, conversion to image data by the analog-to-digital converter 16, and image processing on the image data by the image processing circuit 20, and the shot image is stored in the memory 30. In short, an object is shot.

In a step S102, to capture one or a plurality of frames of the LV image, as images for the live view display, the system control circuit 50 performs an exposure operation (second image capturing) for the image capturing device 14 and causes the memory control circuit 22 to store the generated image data in the memory 30. In a step S103, the system control circuit 50 determines whether or not to continue the continuous shooting. If the continuous shooting is to be continued (YES to the step S103), the system control circuit 50 returns to the step S101, whereas if the continuous shooting is not to be continued (the continuous shooting is terminated) (NO to the step S103), the system control circuit 50 terminates the present process.

Figure 3:
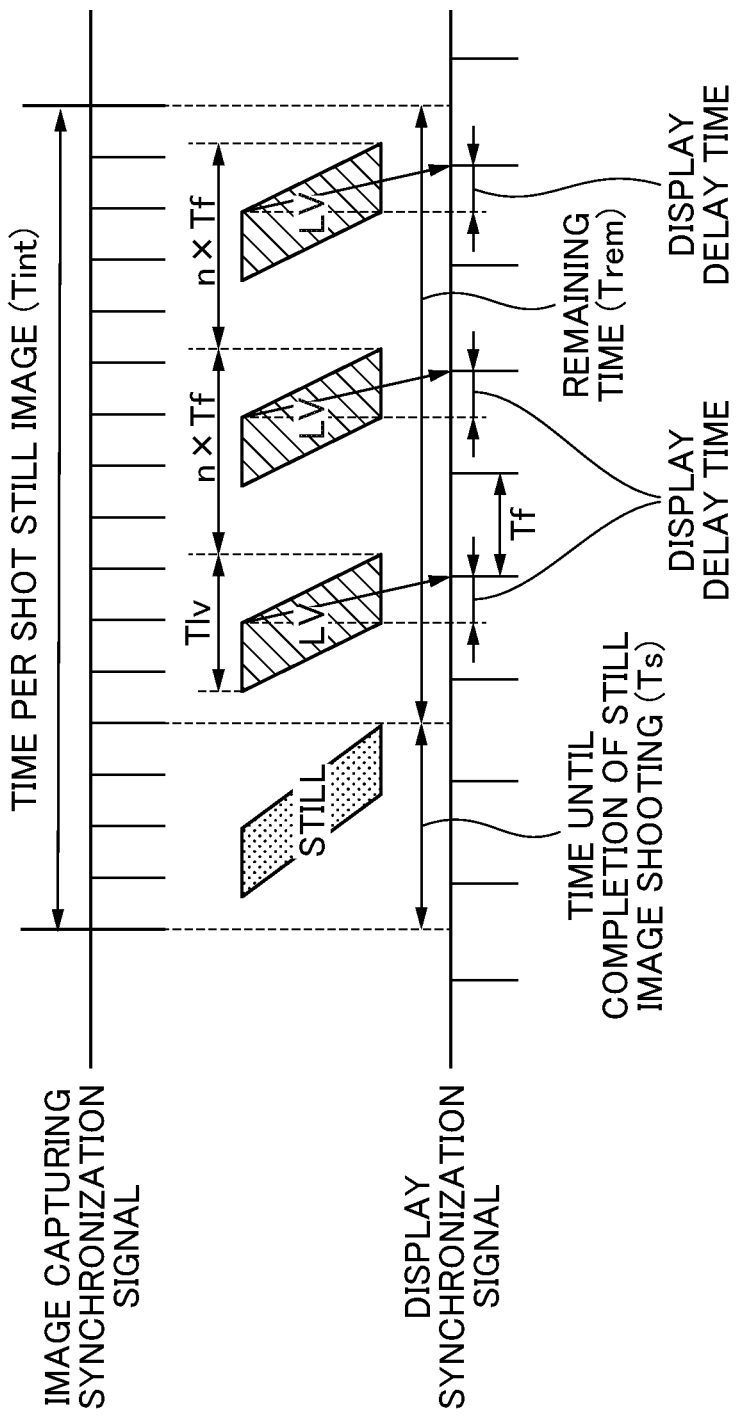
FIG. 3 is a diagram useful in explaining a method of setting capturing timings of still images and LV images.

FIG. 3 is a diagram useful in explaining a method of setting capturing timings of still images and LV images in the present embodiment. In a case where image capturing of a still image and image capturing of a LV image are performed in continuous shooting, first, the system control circuit 50 calculates a time Tint per shot still image based on a continuous shooting speed designated by a user. Then, a still image is captured first within the time Tint per shot still image. That is, a capturing timing of the still image is first set in the time Tint per shot still image. At this time, image capturing of the still image is performed at the timing which is determined according to the shooting frame speed and is independent of (irrelevant to) the display period of the image display device 28. With this, a time Ts from the start point of the time Tint per shot still image to completion of image capturing of the still image is determined according to a shutter speed (exposure time) for capturing the still image. The time Ts can be calculated in advance, and hence, a remaining time Trem can be determined by subtracting the time Ts required to capture the still image from the time Tint per shot still image.

Image capturing of a LV image (a frame of the LV image) is performed in synchronism with the display period of the image display device 28 such that the display delay time of the LV image becomes equal to a predetermined value. That is, the capturing timing of a LV image is set within the remaining time Trem such that the display delay time of the LV image becomes equal to the predetermined value. In a case where image capturing of the LV image can be performed a plurality of times (i.e. image capturing of a plurality of frames of the LV image can be performed) because the remaining time Trem is long, a plurality of timings to capture LV images are set within the remaining time Trem such that the LV images become equal in display delay time. To this end, it is necessary to perform image capturing of the LV image in synchronism with the display period of the image display device 28.

An interval from completion of image capturing of one frame of the LV image to completion of image capturing of the next frame of the LV image is equal to an integer multiple (onefold, twofold, threefold, . . . ) of the display period of the image display device 28. Further, a time required to capture the first frame of the LV image is determined according to a shutter speed for capturing the LV image.

More specifically, as shown in FIG. 3, the period of the display synchronization signal of the image display device 28 is represented by "Tf", the integer is represented by "n", and the exposure time required to capture a LV image (a frame of the LV image) is represented by "Tlv". In this case, a maximum value of the integer x satisfying a condition expressed by "Tlv+(x−1)×(n×Tf)<Trem" is calculated. This integer x indicates the number of times of the operation for capturing a LV image (a frame of the LV image), which can be executed between the operations for capturing time-series adjacent still images.

FIG. 3 shows an example in which "n=2" and "x=3" hold, but this is not limitative. However, it is necessary to set the value of n such that "n×Tf" (the display period of the LV image) becomes longer than the exposure time Tlv of the LV image. Note that in FIG. 3 and FIGS. 4 to 6, referred to hereinafter, image capturing of a still image is simply denoted as the "still", and image capturing of a LV image is denoted as "LV".

Further, the period at which a LV image (a frame of the LV image) is captured (LV image-capturing period) is set to the same period as the shortest display period of the image display device 28. In a case where a plurality of display devices are mounted in the image capturing apparatus 100 and the display period is different between the display devices, by synchronizing the LV image-capturing period with the shortest display period, it is possible to seamlessly maintain the predetermined display delay time even when the display destination is switched during continuous shooting. That is, even when the display destination is switched, it is possible to suppress the motion of an object from becoming unnatural.

Note that as an example of the configuration in which a plurality of display devices are mounted in the image capturing apparatus 100, a configuration can be given in which the image display device 28 is provided with not only the liquid crystal display device or the like on the rear surface of the casing of the image capturing apparatus 100, but also a liquid crystal display device which implements an electronic viewfinder function. By using the electronic viewfinder function, the user can enjoy the same operability as enjoyed in a case where image capturing is performed using an optical finder.

Incidentally, by setting an interval between frames of the LV image regardless of the display period of the image display device 28, it is possible to increase the number of LV images captured between the operations for capturing time-series adjacent still images. It seems that as the number of LV images captured between the operations for capturing time-series adjacent still images is increased, the frame rate of the LV image increases and hence the state of an object can be observed better. However, if the number of LV images is increased, in actuality, the display becomes unnatural due to the influence of a difference in the display delay time between the LV images.

To cope with this, in the present embodiment, in a case where a plurality of LV images are captured between the operations for capturing still images, the display delay time is made constant between the LV images. This makes it possible to naturally display the motion of an object and improve the visibility. The following description will be given of examples of setting of the capturing timings of still images and LV images.

Figure 4:
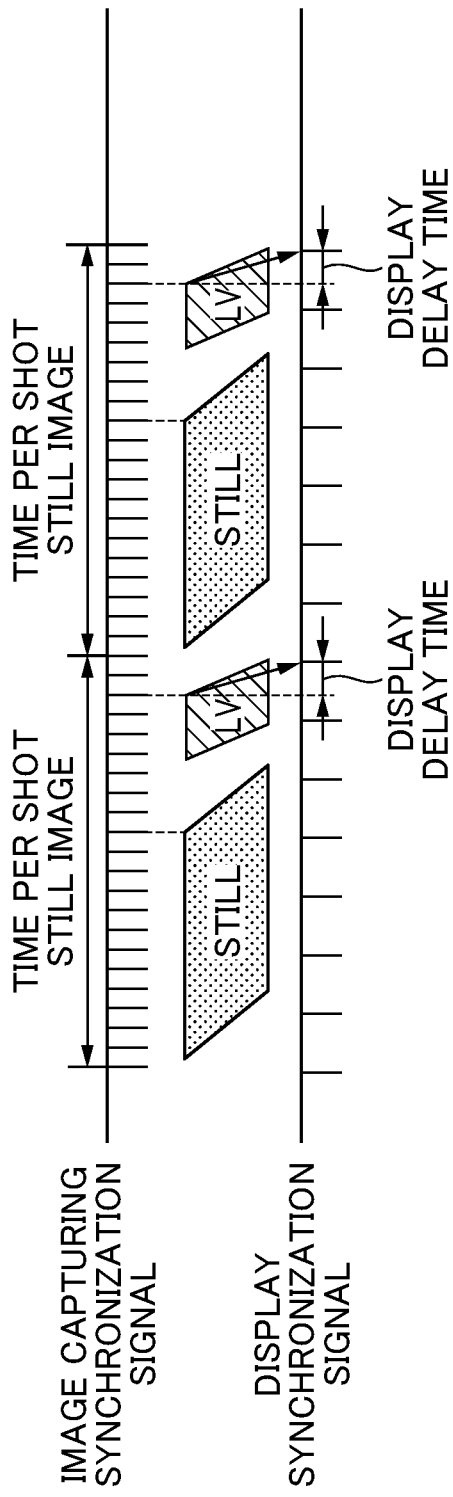
FIG. 4 is a diagram showing a first example of setting capturing timings of still images and LV images.

FIG. 4 is a diagram showing a first example of setting of capturing timings of still images and LV images in a case where the exposure time for capturing a still image is relatively long. In this example, a still image and one frame of a LV image are captured within the time Tint per shot still image. In this example, the display delay time in displaying the LV image is the same in each frame, and therefore, it is possible to naturally display motion of an object.

Figure 5:
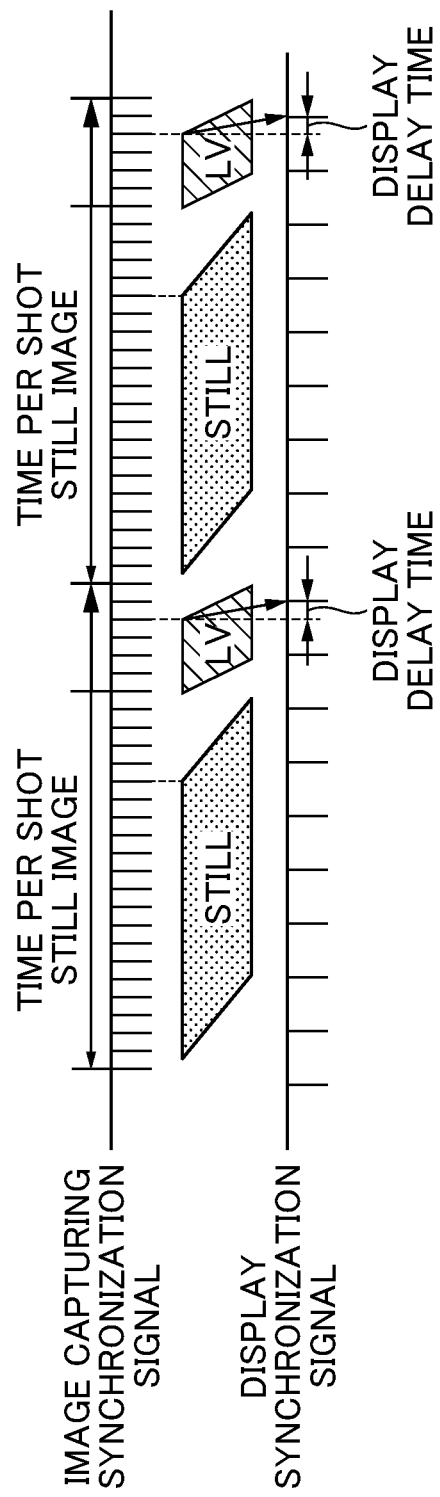
FIG. 5 is a diagram showing a second example of setting capturing timings of still images and LV images.

FIG. 5 is a diagram showing a second example of setting of capturing timings of still images and LV images in a case where the exposure time for capturing a still image is relatively long. The second setting example shown in FIG. 5 differs from the first setting example shown in FIG. 4 in that the respective exposure times required to capture a still image and a LV image are longer, and accordingly, the time Tint per shot still image is made longer.

In continuous shooting in which a still image and a LV image are captured within the time Tint per shot still image, the time Tint per shot still image is calculated as described above, and a still image and at least one frame of the LV image for which the display delay time is made constant are captured. At this time, in a case where the charge accumulation time of the image capturing device 14, which is required to capture a still image, is long as in a case where a still image is captured by long exposure, making insufficient the charge accumulation time required to capture a LV image, the time Tint per shot still image is extended, whereby the still image and at least one frame of the LV image are captured. In this case, the time Tint per shot still image is changed to "Tint=Ts+Tlv".

With this, also in the example shown in FIG. 5, the still image and one frame of the LV image are captured within the time Tint per shot still image. Then, since the display delay time of the LV image can be made equal for each shot still image, it is possible to naturally express motion of an object.

Figure 6:
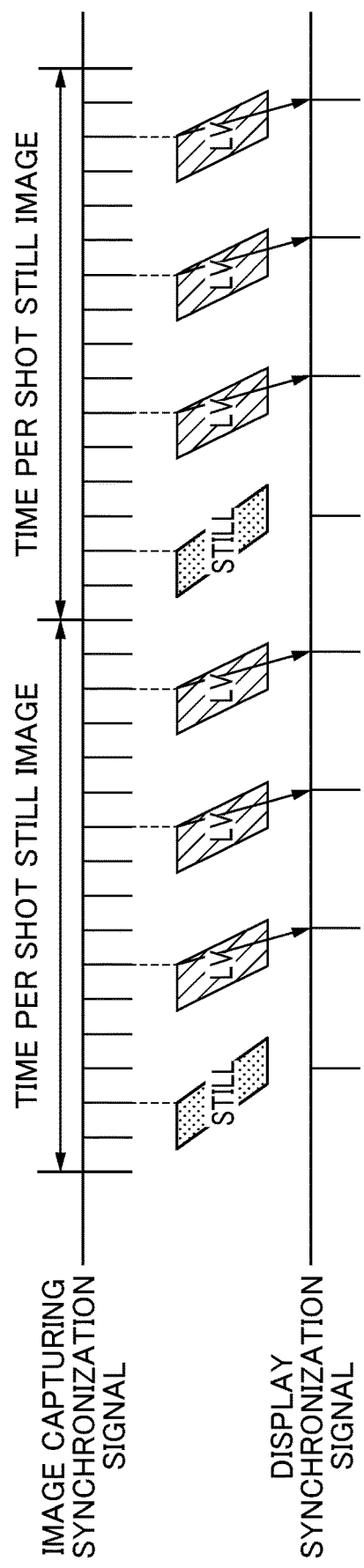
FIG. 6 is a diagram showing a third example of setting capturing timings of still images and LV images.
Figure 7:
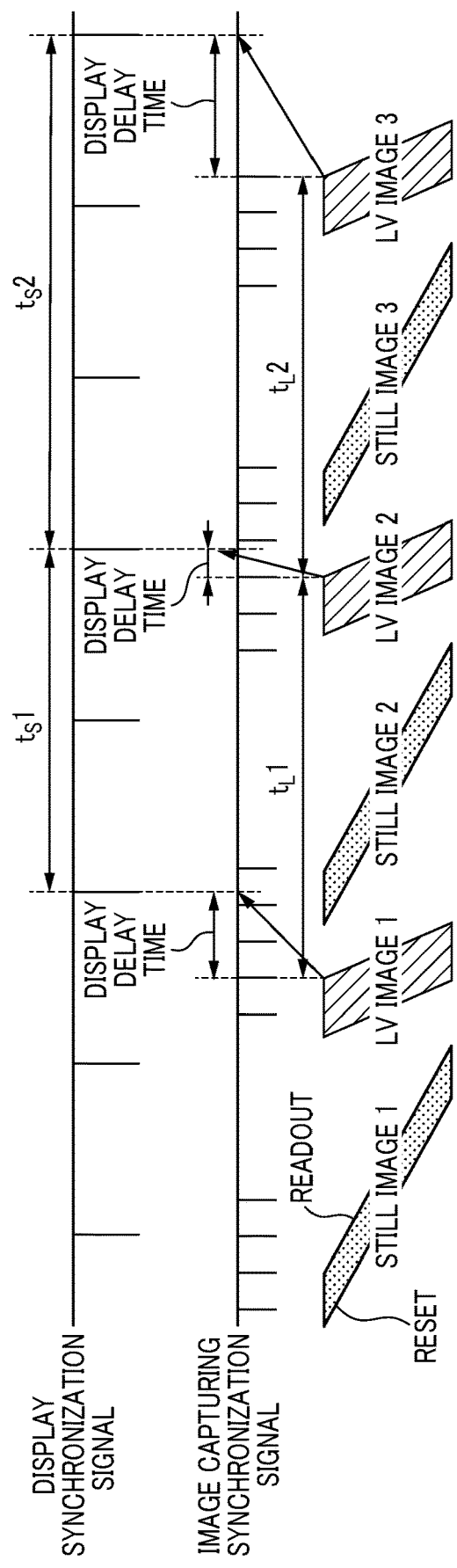
FIG. 7 is a conventional timing diagram for capturing and displaying LV images each during an interval between respective operations for capturing still images.

FIG. 6 is a diagram showing a third example of setting of capturing timings of still images and LV images in a case where the LV image-capturing period is long. Image capturing of a LV image is performed such that the display delay time becomes constant in relation to the display synchronization signal whose period is four times longer than that of the image capturing synchronization signal. Note that image capturing of a still image is performed at a timing independent of the display period of the image display device 28, i.e. at a timing determined according to the shooting frame speed.

If the number n of frames of the LV image is set without considering the period of the display synchronization signal in a case where the period of the display synchronization signal is longer than the period of the image capturing synchronization signal as in the example shown in FIG. 6, there arises a case where the display delay amount is different between the frames of the LV image. For this reason, when a still image is captured within the time Tint per shot still image and a LV image is captured in the remaining time Trem, the maximum number of frames of the LV image which can secure the display delay time are captured. This makes it possible to prevent lowering of the visibility and enables a user to more accurately observe the state of an object.

The present invention has been described heretofore based on the embodiment thereof. However, the present invention is not limited to the embodiment, but it is to be understood that the invention includes various forms within the scope of the gist of the present invention.

For example, in the above-described embodiment, the description is given of the image capturing apparatus 100 including the shooting lens 10, the image capturing device 14, the system control circuit 50, and the image display device 28, the present invention is not limited to this configuration. For example, the present invention can be realized by an image capturing system in which the image capturing means (the shooting lens 10 and the image capturing device 14), the system control circuit 50, and the display device are provided separately and are communicably connected to each other.

It is to be understood that the present invention may also be accomplished by supplying a system or an apparatus with a program which realizes at least one of the functions of the above-described embodiment via a network or a storage medium, and causing one or more processors in a computer of the system or apparatus to read out and execute the program. Further, the present invention may also be accomplished by a circuit (such as an ASIC) which realizes one or more of the functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-007679 filed Jan. 21, 2020, which is hereby incorporated by reference herein in its entirety.

What is claimed is:

1. An image capturing apparatus comprising:
an image capturing unit including an image sensor; and
a control circuit configured to capture a still image for storage and a display image for display on a display device, using the image capturing unit,
wherein, for still image continuous shooting by the image capturing unit, the control circuit is configured to set a capturing timing of the still image and thereafter set a capturing timing of the display image such that at least one frame of the display image can be displayed on the display device with a predetermined delay time within a remaining time obtained by subtracting a time required to capture the still image from a period at which the still image is captured,
wherein the control circuit is configured to calculate the period at which the still image is captured based on a still image continuous shooting speed, and
wherein, in a case where the remaining time is insufficient to capture the display image, the control circuit is configured to extend the period to a length during which the still image and one frame of the display image can be captured.

2. The image capturing apparatus according to claim 1, wherein in a case where image capturing of the display image can be performed a plurality of times within the remaining time, the control circuit is configured to set the capturing timing of each of a plurality frames of the display image such that the plurality frames of the display image which are captured become equal in the delay time.

3. The image capturing apparatus according to claim 2, wherein the control circuit is configured to capture the maximum number of frames of the display image, which can be made equal in the delay time.

4. The image capturing apparatus according to claim 1, wherein the control circuit is configured to set the capturing timing of the still image independently of a display period of the display device.

5. The image capturing apparatus according to claim 1, wherein the control circuit is configured to set a period at which the display image is captured to a same period as a display period of the display device.

6. The image capturing apparatus according to claim 5, wherein in a case where the display device comprises a plurality of display devices having different display periods, the control circuit sets the period at which the display image is captured to a same period as a shortest display period among the display periods of the plurality of display devices.

7. A method of controlling an image capturing apparatus, comprising:
calculating a period corresponding to a time per shot still image for continuously shooting still images for storage based on a designated continuous shooting speed;
setting a capturing timing of the still image first in the time per shot still image;
calculating a remaining time by subtracting a time required to capture the still image from the period;
setting a capturing timing of a display image for display on a display device such that at least one frame of the display image can be displayed on the display device with a predetermined delay time within the remaining time; and
in a case where the remaining time is insufficient to capture the display image, extending the period to a length during which the still image and one frame of the display image can be captured.

* * * * *